United States Patent [19]

Janssen

[11] Patent Number: 5,044,265

[45] Date of Patent: Sep. 3, 1991

[54] COOKING UTENSIL ACCESSORIES

[76] Inventor: Alexander P. Janssen, 28 Old Farm Rd., Bellair, Charlottesville, Va. 22903

[21] Appl. No.: 282,463

[22] Filed: Dec. 8, 1988

[51] Int. Cl.$^5$ .............................................. A47J 36/20
[52] U.S. Cl. ........................................ 99/418; 99/449
[58] Field of Search ................. 99/279, 295, 323, 403, 99/404, 405, 406, 407, 408, 409, 411, 412, 413, 414, 415, 416, 417, 418, 449, 450, 467, 306; 220/66, 67, 68, 69, 70, 70.1, 83, 403, 401, 404; 126/39 M; 229/3.5 MF; 426/397, 403, 12

[56] References Cited

U.S. PATENT DOCUMENTS

| | | | |
|---|---|---|---|
| Re. 27,345 | 4/1972 | Weisberg | 426/113 |
| 508,831 | 11/1893 | Habberton . | |
| 1,193,353 | 8/1916 | Brown | 99/418 X |
| 1,217,818 | 2/1917 | Peterson . | |
| 1,272,222 | 7/1918 | Clayton | 99/418 |
| 1,281,984 | 10/1918 | Long . | |
| 1,445,457 | 2/1923 | Simon | 99/412 |
| 1,566,874 | 12/1925 | Jackson . | |
| 1,704,879 | 3/1929 | Bridgham . | |
| 2,323,623 | 7/1943 | Porter et al. . | |
| 2,557,613 | 6/1951 | Palensky | 99/413 |
| 2,807,550 | 9/1957 | Zarotschenzeff et al. . | |
| 2,912,336 | 11/1959 | Perino . | |
| 2,990,096 | 6/1961 | Crosby . | |
| 3,008,837 | 11/1961 | Kaplan . | |
| 3,027,261 | 3/1962 | Samara . | |
| 3,027,999 | 4/1962 | Heroy, Jr. | 206/806 |
| 3,088,255 | 5/1963 | Griem . | |
| 3,117,875 | 1/1964 | Burns et al. . | |
| 3,136,409 | 6/1964 | Schumann . | |
| 3,249,285 | 5/1966 | Dollheimer et al. . | |
| 3,307,955 | 3/1967 | Pirtle . | |
| 3,407,077 | 10/1968 | Helin . | |
| 3,547,660 | 12/1970 | Weisberg . | |
| 3,597,238 | 8/1971 | Scharre . | |
| 3,615,711 | 10/1971 | Markus et al. . | |
| 3,625,348 | 12/1971 | Titchenal et al. . | |
| 3,716,369 | 2/1973 | Perlman . | |
| 3,750,873 | 8/1973 | Roman . | |
| 3,779,231 | 12/1973 | Anderson | 126/373 |
| 3,873,735 | 3/1975 | Chalin et al. | 426/87 |
| 3,935,810 | 2/1976 | Milano | 99/467 |
| 3,946,654 | 3/1976 | Janssen | 99/403 |
| 4,005,645 | 2/1977 | Janssen | 99/403 |
| 4,215,629 | 8/1980 | Janssen | 99/403 |
| 4,412,482 | 11/1983 | Janssen | 99/403 |
| 4,499,817 | 2/1985 | Janssen | 99/403 |

FOREIGN PATENT DOCUMENTS

| | | | |
|---|---|---|---|
| 459316 | 5/1928 | Fed. Rep. of Germany | 99/418 |
| 333782 | 1/1936 | Italy | 99/418 |
| 965498 | 7/1964 | United Kingdom . | |
| 966253 | 8/1964 | United Kingdom . | |
| 1221098 | 2/1971 | United Kingdom . | |

OTHER PUBLICATIONS

Cooking Magic Bags, The Drackett Products Co., 1971, month unknown.
Meals in Minutes, Sears Roebuck and Company 1973, month unknown.
Dazey Jul. 1976 Buyers' Guide.
Dazey Seal-a-Meal Recipe and Instruction Book, 1975, month unknown.
Arthur Godfrey's Selling Seal-A-Meal, date unknown.
Reproduction of the top, bottom and sides of a box, Cooking Magic Bags, The Drackett Products Co., 1972, month unknown.

Primary Examiner—Harvey C. Hornsby
Assistant Examiner—Scott J. Haugland
Attorney, Agent, or Firm—Hughes & Multer

[57] ABSTRACT

Accessories for making conventional cooking utensils usable with disposable bags to produce cooked comestibles of superior quality and to eliminate the cleaning up appurtenant to conventional cooking techniques. A trivet at the lower end of the accessory supports the bottom of the bag above the bottom of the cooking utensil or vessel in which the trivet is installed. That keeps the bag from sticking to the bottom of the utensil; it also promotes the speed and uniformity with which the comestibles in the bag are cooked.

15 Claims, 7 Drawing Sheets

COOKING UTENSIL ACCESSORIES

TECHNICAL FIELD OF THE INVENTION

The present invention relates to the cooking of comestibles and, more specifically, to novel, improved accessories of that character which can be employed with a disposable cooking bag in a conventional cooking vessel to produce cooked comestibles of superior quality and to eliminate the clean-up appurtenant to the use of a conventional cooking vessel.

BACKGROUND OF THE INVENTION

Earlier issued Janssen U.S. Pat. No. 4,005,645 dated Feb. 1, 1977 and entitled COOKING UTENSIL ACCESSORIES is concerned with cooking utensil accessories of the character described in the preceding paragraph. In cooking comestibles with the accessories described in the '645 patent, the disposable, comestibles-containing bag is surrounded by a cooking medium which transfers heat to the contents of the bag during the cooking cycle. The cooking medium will typically be water in the case of stovetop cookery and air for oven cookery.

Cooking in disposable bags as just described has a number of important advantages. First, this permits comestibles to be cooked in their own juices. The natural taste of the food is thereby preserved; and the loss of nutritional values which occurs when foods are cooked in water is avoided, along with the mushy or waterlogged texture which commonly results.

Another virtue is that the utensil is not soiled during the cooking process. Thus, the inconvenience of cleaning the utensil after it is used is eliminated; only rinsing and drying are required.

Furthermore, the bag in which the comestibles are cooked can be used to store them. This is a particular convenience if the bag is stored in a refrigerator container or the like as the latter will not become soiled.

Particularly useful embodiments of the previously disclosed Janssen cooking utensil accessories have an arrangement for detachably securing the lower corners of the bag in place. This produces two important advantages.

First, this keeps the bag from being buoyed upwardly in a liquid cooking medium and, also, permits the cooking medium to more effectively collapse the bag against the comestibles. The result is that the bag is more uniformly surrounded by the cooking medium, producing more efficient and uniform cooking of the comestibles.

Second, by securing the lower end of the bag in place, corners are eliminated; and a rounded, more open shape is given to the lower end of the bag. This significantly facilitates access to the comestibles in the bag and the removal of the comestibles from the bag.

Novel, disposable, comestibles-containing bags for the cooking utensil accessories just described are disclosed in Janssen U.S. Pat. Nos.: 4,412,482 dated Nov. 1, 1983 and entitled DISPOSABLE COOKING BAGS and 4,499,817 dated Feb. 19, 1985 and also entitled DISPOSABLE COOKING BAGS and in copending application Ser. No. 145,516 filed Jan. 19, 1987 by the same inventor for DISPOSABLE BAGS.

The disposable cooking bags disclosed in the foregoing patents and application have an open upper end; and the cooking utensil accessories with which they are used have a hollow, circular base and a set of concomitantly pivotable, bag-supporting elements that are spaced around the base and attached to the upper edge of the base. The inner ends of the pivotable elements are clipped or otherwise fixed to the upper edge of the disposable bag at intervals therearound. Those elements can consequently be pivoted: (1) upwardly and outwardly to open the upper end of the bag, and (2) downwardly and inwardly to close that end of the bag.

Thus, the upper end of the bag can be opened or spread to facilitate the loading of comestibles into the bag and the removal of cooked comestibles from the bag. And the just-described mechanism allows the upper end of the disposable bag to be closed during the cooking cycle to the extent that a liquid cooking medium surrounding the bag is kept from entering the bag while gases and vapors evolved from the comestibles are allowed to escape. This permits the bag to collapse against its contents, considerably increasing the efficiency with which heat is transferred to the comestibles; it also maximizes the uniformity with which heat is transferred to the comestibles from different directions. Furthermore, by permitting gases and vapors to escape, the tendency of the bag to float is minimized as is the possibility of the bag rupturing due to a build-up of internal pressure.

Nothwithstanding their many desirable attributes, the cooking utensil accessories disclosed in the '645 patent have a significant drawback; viz., that the comestible-filled bag can sag toward the bottom of the cooking vessel.

This has at least two disadvantages.

First, if the bag is filled with a heavy enough load of comestibles, the lower end of the bag may actually come into contact with, and stick to, the bottom of the cooking vessel. Why this is undesirable is obvious.

Second, even if the bag does not sag to this extent, its lower end may sink far enough to inhibit the circulation of the cooking fluid between that end of the bag and the bottom of the cooking vessel. This can undesirably retard the cooking of the comestibles and, also, cause the comestibles to cook unevenly.

SUMMARY OF THE INVENTION

I have now invented, and disclosed herein, certain new and novel cooking utensil accessories in which this problem of the lower end of the comestibles-containing cooking bag sagging toward the bottom of the cooking utensil or vessel is solved in an elegant, inexpensive, and completely satisfactory manner.

These accessories have a vertically oriented, open-ended, cylindrical base which surrounds the disposable, comestibles-containing, cooking bag. The solution to the problem of the lower bag end sagging involves the use of a horizontally oriented, perforated trivet at the lower end of the base to support the bag.

It is preferred that the trivet be detachable from the base of the accessory as the disposable cooking bag can be most easily installed in the accessory if the trivet is first detached. This objective can be easily met by employing a simple, bayonet type coupling between the trivet and the base of the accessory.

A second, also entirely practical solution to the problem of bag sag involves the use of an accessory with an integral, bag-supporting trivet at the lower end of the accessory base. In this case, slots are formed in and on opposite sides of the base immediately above the trivet. The lower corners of the disposable cooking bag are pulled through these slots and connected to studs on the outer side of the accessory base to secure the lower end of the bag in place.

It is preferred that the bag-supporting trivet be perforated, irrespective of whether it is of the fixed or detachable type. The perforations allow the cooking fluid to circulate into contact with the lower end of the bag, again promoting efficient and uniform cooking of the bag's contents.

OBJECTS OF THE INVENTION

From the foregoing, it will be apparent to the reader that one important and primary object of my invention resides in the provision of novel, improved attachments or accessories for making conventional cooking utensils usable in conjunction with disposable bags to cook comestibles:

in a manner which will keep them from acquiring a mushy or waterlogged texture;

in a manner which will preserve their flavor;

in a manner which will result in heat being transferred more evenly and efficiently from the cooking medium to the bag and the comestibles being cooked therein, producing more uniformly cooked comestibles faster and at a lower cost;

in a manner which makes the comestibles readily removable even though the bag remains attached to the accessory;

conveniently and without the soiling of cooking vessels;

in a manner which makes leftovers convenient to store.

Another primary and equally important object of the present invention is the making available of cooking utensil accessories in accord with the preceding object in which provision is made for supporting the lower end of the disposable cooking bag above the bottom of the utensil in which the accessory is employed to promote efficient and uniform cooking of the comestibles in the bag and to keep the lower end of the bag from sticking to the bottom of the cooking utensil.

Related and also important but more specific objects of my invention are:

the provision of cooking utensil accessories as defined in the preceding object in which have a removable, or an integral, trivet at the lower end thereof to support the lower end of the comestibles-containing bag above the bottom of the cooking vessel;

the provision of trivets as characterized in the preceding object which are perforated and therefore allow a fluid cooking medium to circulate into contact with the lower end of the disposable bag, thereby promoting efficient and uniform cooking of the comestibles in the bag.

Other important objects and features and additional advantages of my invention will be apparent to the reader from the foregoing and the appended claims and as the ensuing detailed description and discussion proceeds in conjunction with the accompanying drawing.

IN THE DRAWING

DETAILED DESCRIPTION OF THE INVENTION

Figure 1:
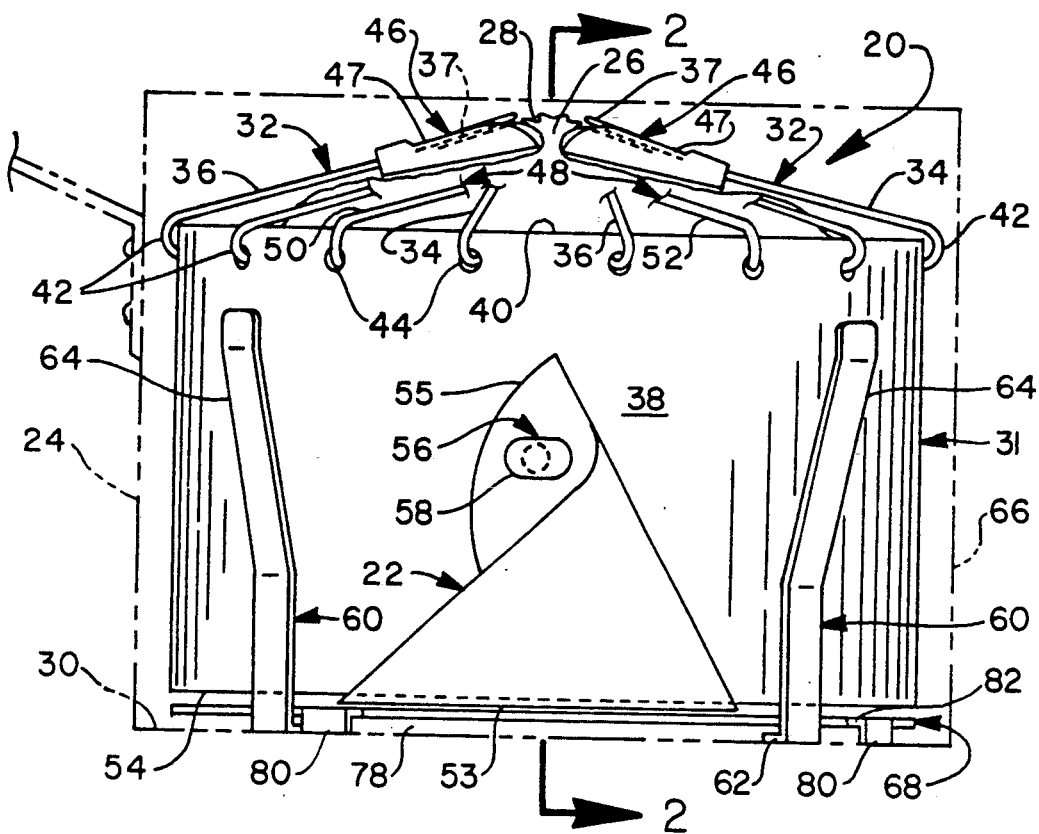
FIG. 1 is a side view of a disposable, comestibles-containing cooking bag installed in a cooking utensil accessory constructed in accord with, and embodying, the principles of the present invention and employed to support the bag and its contents above the bottom of a cooking utensil in which the accessory is employed.
Figure 2:
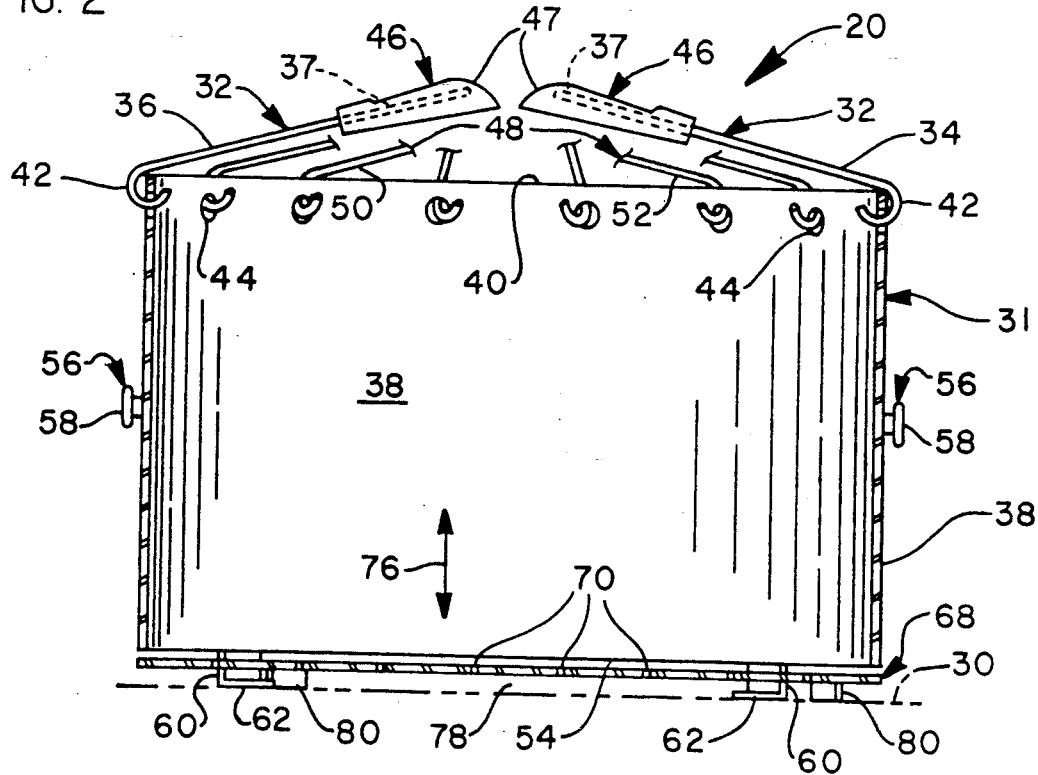
FIG. 2 is a section through the accessory of FIG. 1, taken substantially along line 2—2 of the latter.
Figure 2A:
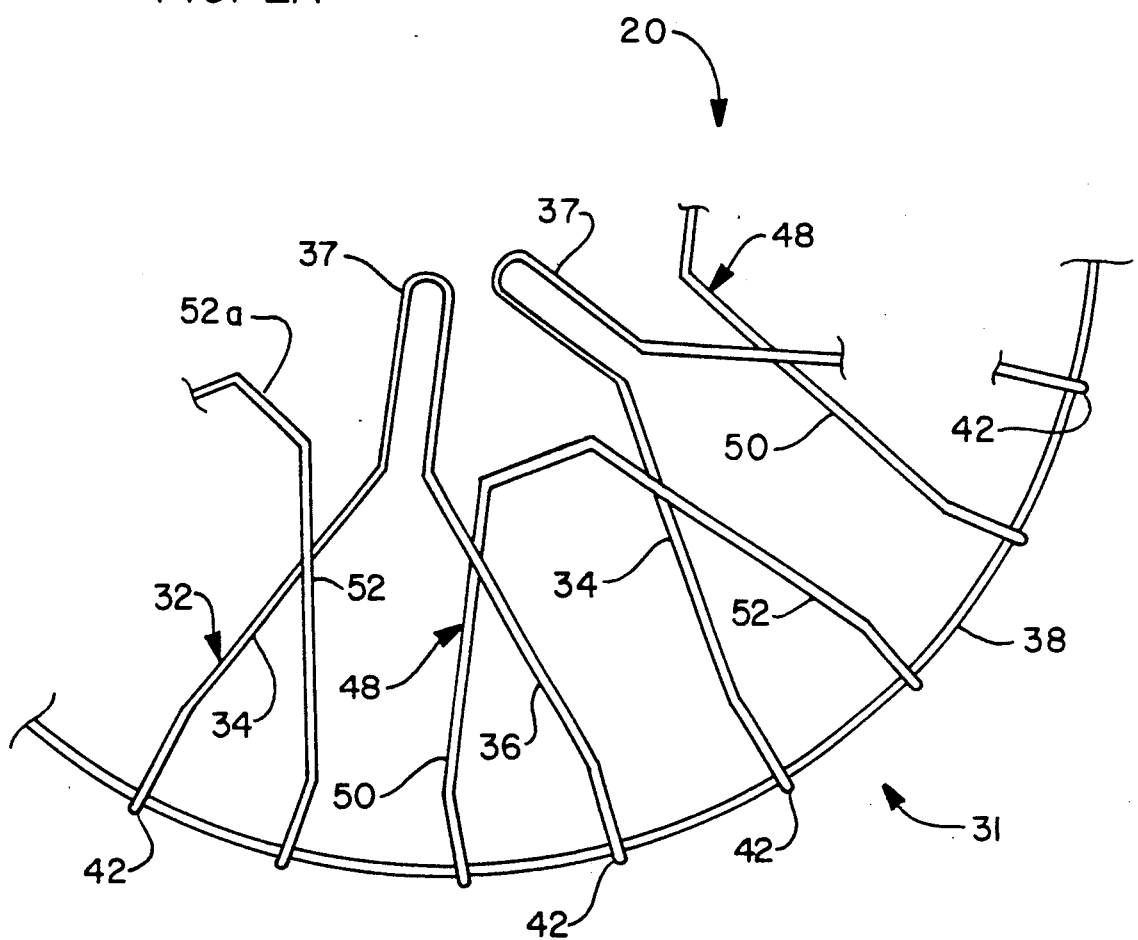
FIG. 2A is a partial plan view with certain elements omitted for the sake of clarity of a base included in the accessory of FIG. 1 and equipped with components to which the upper and lower ends of the disposable cooking bag can be attached.

Referring now to the drawing, FIGS. 1, 2, and 2A depict a cooking utensil accessory 20 constructed in accord with and embodying the principles of the present invention. This accessory is employed to support a disposable, comestibles-containing bag 22 in a conventional cooking vessel or utensil 24 so that comestibles in the bag can be cooked by a heated fluid—such as water—in utensil 24 in a way which preserves the taste, texture, and nutritional value of the comestibles, all without soiling the vessel 24 in which the comestibles are cooked.

Accessory 20 is employed to keep disposable bag 22 submersed while the comestibles are cooking, to constrict an opening 26 at the upper end or edge 28 of the bag during the cooking process, to subsequently enlarge opening 26 so that comestibles can be easily loaded into and removed from the bag, and to space the bottom of bag 22 above the bottom 30 of utensil 24 so that: (1) the bag will not stick to the bottom 30 of the utensil, and (2) the comestibles will cook rapidly and uniformly.

Among the major components of bag-associated accessory 20 are a hollow, cylindrical, circularly sectioned base 31 and a set of cooperating, inwardly extending elements 32 for supporting the upper end 28 of bag 22 from base 31.

Each of the bag-supporting elements 32 has a left-hand leg 34 and a right-hand leg 36 connected by a necked down, integral, U-shaped portion 37 at the inner end of the element (see, especially, FIG. 2A).

Bag-supporting elements 32 are pivotally fixed to the side wall 38 of base 31 at the upper edge 40 thereof. The pivotable connections to the base are provided by circular end portions 42 of legs 34 and 36. These extend through apertures 44 in the side wall 38 of base 31.

The upper end or edge 28 of disposable cooking bag 22 is attached to the inner ends of bag-supporting elements 32 by spring clips 46 as is shown in FIG. 1. These spring clips are defined by the resilient, U-shaped, inner end portions 37 of bag-supporting elements 32 and rigid members 47 fixed to the bag-supporting elements. The inner ends 37 of the bag-supporting elements are dimensioned and configured to trap the upper edge 28 of bag 22 against rigid spring clip members 47 to thereby secure the upper edge or end of the bag to bag-supporting elements 32.

In bag-associated accessory or attachment 20, the pivotable, bag-supporting members 32 with bag-engaging spring clips 46 are alternated with concomitantly pivotable elements 48 having truncated legs 50 and 52 connected by an integral, lateral leg 52a (see FIG. 2A). The pivotable elements 48 are connected to base 31 in the same manner as bag-supporting elements 32 with the left-hand leg of each element 32 or 48 lying under the right-hand leg of the element to its left and the right-hand leg of the element overlying the left-hand leg of the element to its right. Thus, each element 32 or 48 supports and is supported by the adjacent pivotable element. As a consequence, all of the elements 32 and 48 move in unison as one of them is rotated either upwardly and outwardly to open bag 22 or downwardly and inwardly to close the opening 26 at the upper end 28 of the bag.

In one actual embodiment of my invention, intended for use with a four-quart saucepan, there are six bag-supporting elements of the character identified by reference character 32. There are five pivotable elements of the character identified by reference character 48. The place of a sixth element of the latter type is taken by the pivotable member of a retainer or toggle mechanism (likewise now shown) which is employed to: (1) limit the inward and downward movements of elements 32 and 48 in closing the opening 26 in comestibles-containing bag 22, and (2) latch the elements 32 and 48 when they are rotated upwardly and outwardly to enlarge opening 26. This latching of elements 32 and 48 holds bag 22 open so that comestibles can be conveniently loaded into and removed from the bag.

The limiting of the downward movement of bag-supporting elements 32 is important because it permits bag 22 to collapse around the comestibles being cooked in that bag in a manner which insures uniform and efficient cooking of the comestibles and keeps the cooking medium from flowing into the bag in those applications where a liquid cooking medium is employed. Also, this limiting of downward movement keeps the various pivotable accessory components from pivoting downwardly to the extent that the element attaching loops at their outer ends can become unhooked from attachment base 31. Accordingly, it is not necessary to close these loops after the pivotable elements are assembled to base 31. This simplifies the assembly of accessory 20 and reduces the cost of producing it.

Provision is also made in accessory 20 for stretching the lower end 53 of the disposable cooking bag 22 across the lower end 54 of the attachment base 31 and then securing or anchoring the lower corners 55 of the bag (one of these is shown in FIG. 1) to base 31 to keep the bottom of the bag tautly stretched across the lower end 54 of accessory base 31. As discussed previously, this eliminates the corners, facilitating the removal of comestibles from bag 22. Also, the lower end of the bag and its contents are kept from floating upwardly, promoting rapid and uniform cooking of the comestibles.

More specifically, bag 22 is secured to the base 31 of accessory 20 by stretching its closed end 53 across the lower edge 54 of the base and then hooking the lower corners 55 of the bag over outwardly projecting studs 56. The studs are fixed to the cylindrical side wall 38 of base 31 and extend through holes in the bag adjacent its lower corners 55. Two diametrically opposed studs 56 are employed, one for each of the two corners 55 of the bag.

Studs 56 preferably have enlarged heads 58 over which bag 22 is stretched. The bag then relaxes to its original configuration so that the enlarged heads 58 of the studs keep the corners 55 of the bag in place.

The base 31 of attachment 20 can be made from such diverse materials as aluminum or other sheet metals and appropriate, heat resistant polymers. Legs 60 fixed to the base and terminating in horizontal, inwardly directed feet 62 support the base from the bottom wall 30 of the vessel 24 with which attachment 20 is employed. Spring arms 64, integral with legs 60, engage the vessel side wall 66 and center accessory 20 in the vessel. By virtue of this and the supporting of the accessory base 31 in spaced relation to bottom wall 30 of vessel 24, free circulation of the cooking medium to promote uniform cooking of the comestibles in bag 22 is provided.

As thus far described, the novel cooking utensil accessory 20 disclosed herein is very much like those disclosed in the above-cited U.S. Pat. No. 4,005,645. That patent is hereby incorporated by reference herein; and the reader may refer to it for further details, if desired.

The novel cooking utensil 20 depicted in FIGS. 1, 2, 2A, 4, and 5 differs from the accessory of the same general character disclosed in U.S. Pat. No. 4,005,645 primarily in that it includes a trivet 68 for supporting the lower end 53 of disposable, comestibles-containing bag 22 above, and in spaced relationship to, the bottom 30 of cooking utensil 24. As discussed above, this is a significant and important innovation in that: (1) trivet 68 eliminates any possibility of bag 22 sticking to the bottom 30 of cooking utensil 24, and (2) the spacing of the bag's lower end 53 above the bottom 30 of cooking utensil 24 allows a cooking medium in the utensil to circulate under disposable, comestibles-containing bag 22, increasing the efficiency and uniformity with which the comestibles in bag 22 are cooked.

Figure 3:
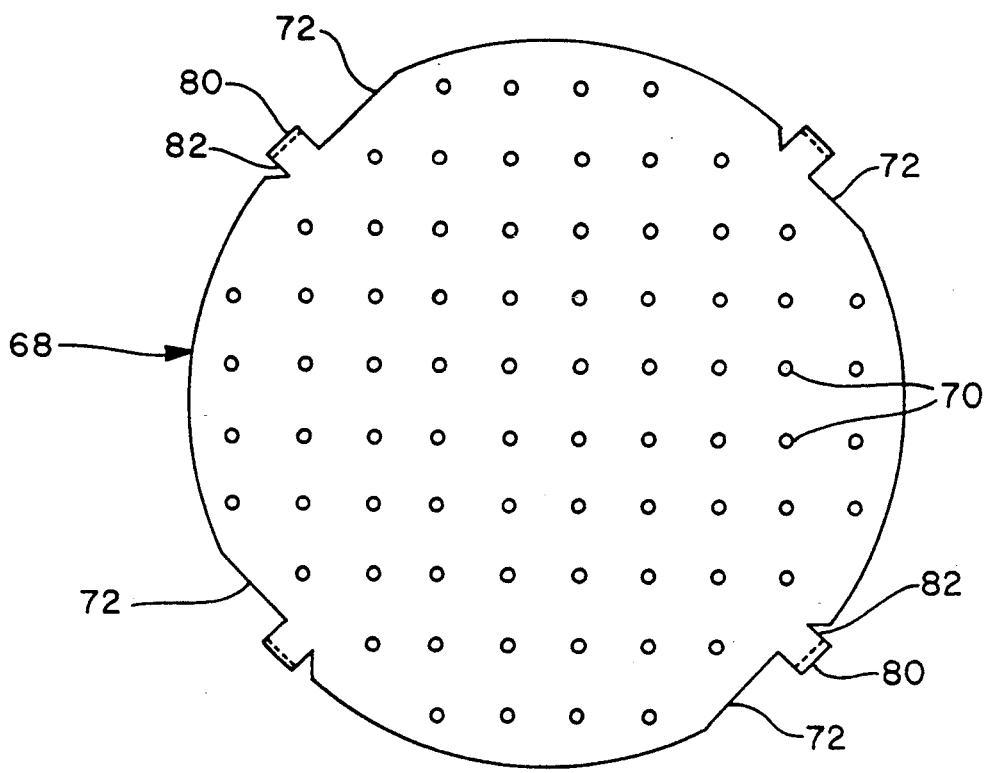
FIG. 3 is a plan view of a removable trivet employed in the accessory of FIG. 1 to support the lower end of the disposable cooking bag above, and in spaced relation to, the bottom of the cooking vessel in which the accessory is employed.
Figure 4:
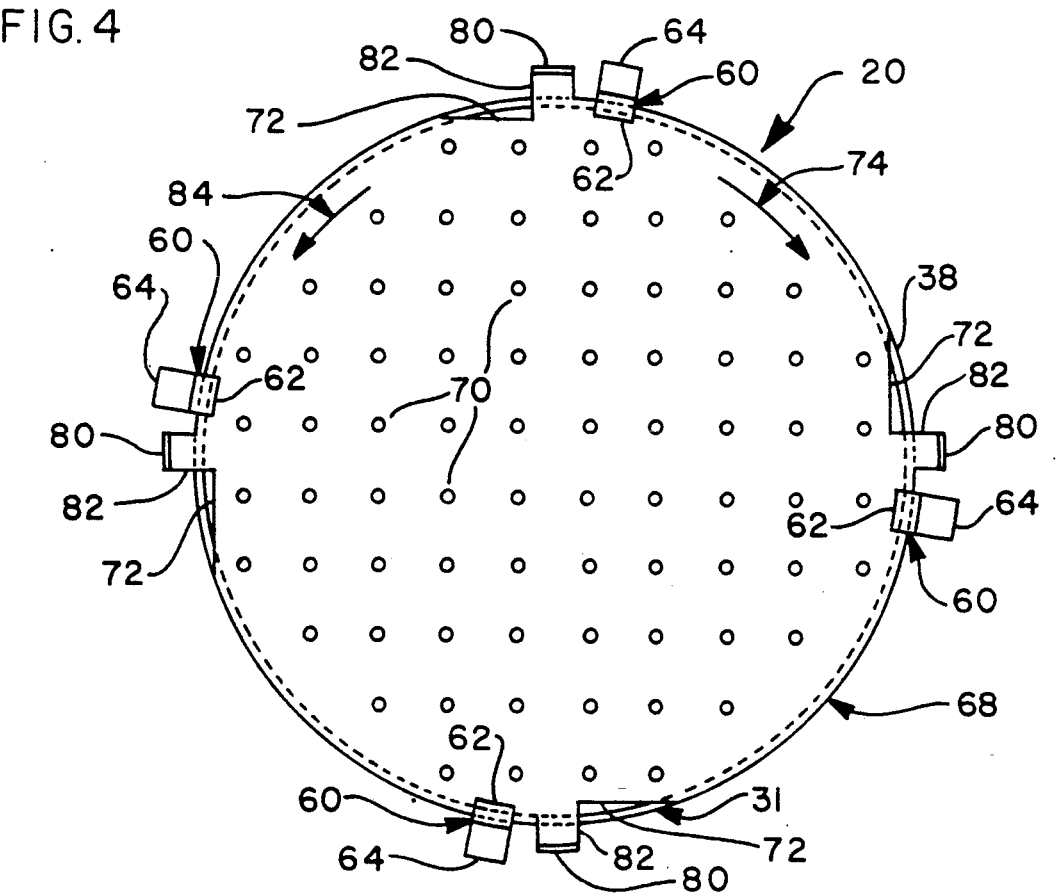
FIG. 4 is a bottom view of the accessory of FIG. 1, showing the trivet of FIG. 3 assembled and locked to the base of the accessory at the lower end of the base.
Figure 5:
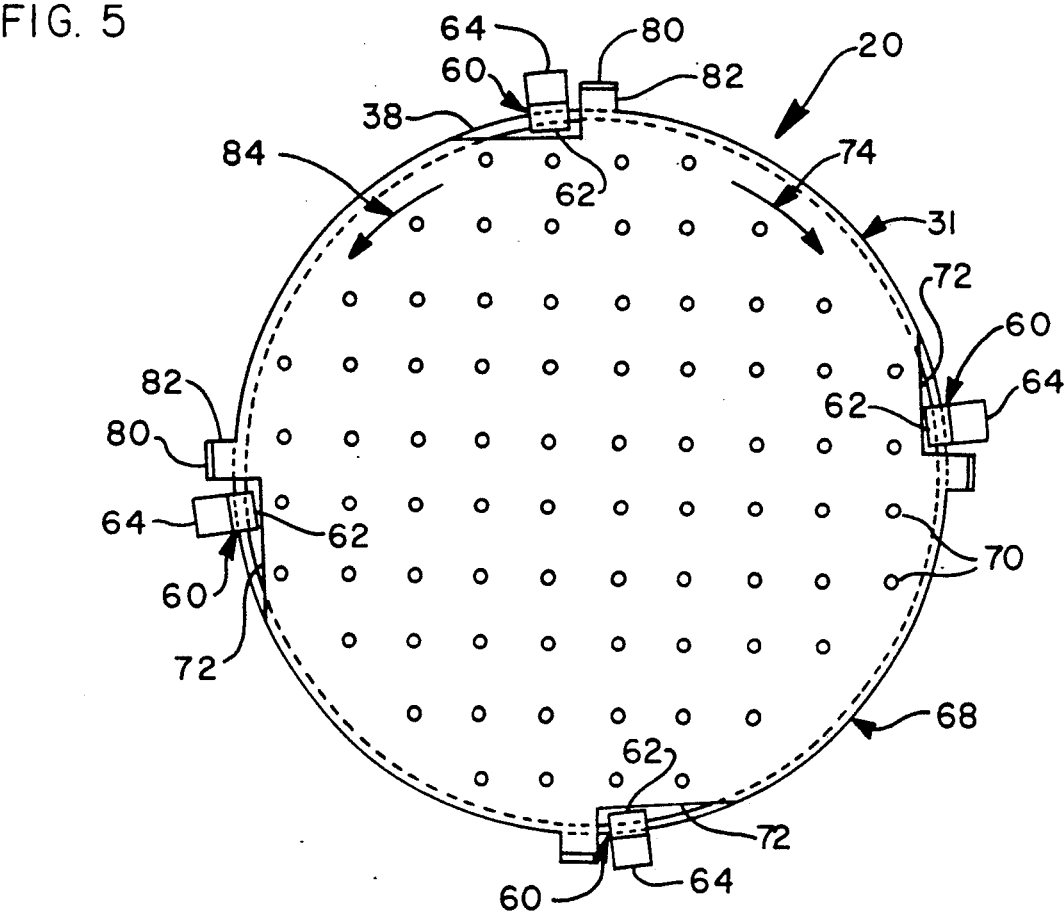
FIG. 5 is a view similar to FIG. 4 but with the trivet rotated from the position shown in that figure about a vertical axis to an unlocked position; this allows the trivet to be removed from the base, thereby facilitating the assembly of the disposable cooking bag to the cooking utensil accessory.

Referring now to FIGS. 3–5, as well as FIGS. 1 and 2, trivet 68 is a flat, generally circular component fabricated from a material with high heat conductivity such as sheet steel. Perforations 70 through trivet 68 allow a cooking medium in utensil 24 to circulate upwardly through the trivet and to contact disposable, comestibles-containing bag 22. This further promotes the efficient and uniform cooking of the comestibles in bag 22.

Trivet 68 is detachably connected to the base 31 of cooking utensil accessory 20 by a bayonet type locking arrangement to facilitate the installation of accessory 20 in cooking utensil 24 and to permit accessory 20, disposable cooking bag 22, and the cooked comestibles in that bag to be conveniently removed from cooking utensil 24.

The just-alluded-to locking arrangement is comprised in part by flats 72 formed around the periphery of trivet 68 at intervals corresponding to those between the legs 60 of cooking utensil accessory 20. This allows the trivet to be manipulated upwardly past the feet 62 at the lower ends of legs 60 (see FIG. 5) to a position above feet 62 such as that shown in FIG. 2. Thereafter, the trivet is rotated relative to the base 31 of cooking utensil accessory 20 in the direction indicated by arrow 74 in FIGS. 4 and 5 until the trivet reaches the position relative to cooking utensil accessory base 31 shown in FIG. 4. With trivet 68 located relative to base 31 as shown in that figure, the base-supporting feet 62 at the lower ends of legs 60 extend inwardly past the edges of the trivet and detachably secure it to the accessory base 31.

It will be appreciated from FIG. 2 that the bayonet type locking arrangement just described allows trivet 68 to move up and down with respect to the base 31 of accessory 20 as shown by the double headed arrow 76 in that figure. To maintain that degree of spacing between the trivet and the bottom 30 of cooking utensil 24 deemed necessary for adequate circulation of the cooking medium through the space 78 between the trivet and the bottom 30 of the cooking utensil, integral, depending, trivet supporting legs 80 are stricken from trivet 68. As is shown in FIGS. 4 and 5, each of these legs 80 is integral with and lies at the outward end of a radially extending, also integral bracket or support 82. These brackets 82 are also spaced around the periphery of trivet 68 at intervals corresponding to those between the legs 60 of accessory 20. Therefore, as is shown in FIG. 4, brackets 82 double in function as stops. They prevent further rotation of the trivet 68 in the direction indicated by arrow 74 when the trivet reaches the position relative to accessory base 31 in which the trivet is locked to that base of accessory 20.

Trivet 68 can be detached from the base 31 of cooking utensil accessory 20 simply by rotating the trivet in the opposite direction relative to base 31 as shown by arrow 84 from the position shown in FIG. 4 to that depicted in FIG. 5 and thereafter manipulating the trivet past the feet 62 of the accessory.

FIGS.: (1) 6 and 7, (2) 8 and 9, and (3) 10–12 respectively depict embodiments of the present invention which are in many respects similar to that embodiment discussed above and depicted in FIGS. 1–5. To the extent that the elements of those three embodiments are like the elements of accessory 20, they will be identified by the same reference characters in the drawing and in the detailed descriptions of those embodiments which follow hereinafter.

Figure 6:
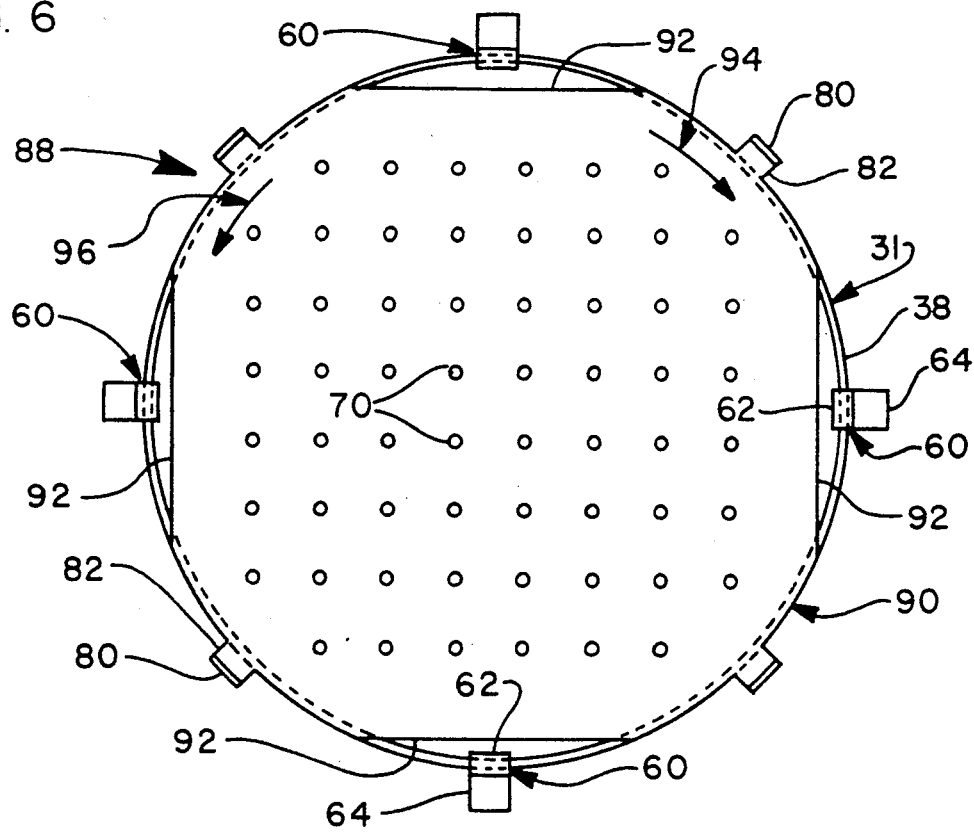
FIG. 6 is a bottom view of a second cooking utensil accessory embodying the principles of the present invention and employing a trivet with the trivet in an unlocked position in which it can be assembled to or detached from the base of the accessory.
Figure 7:
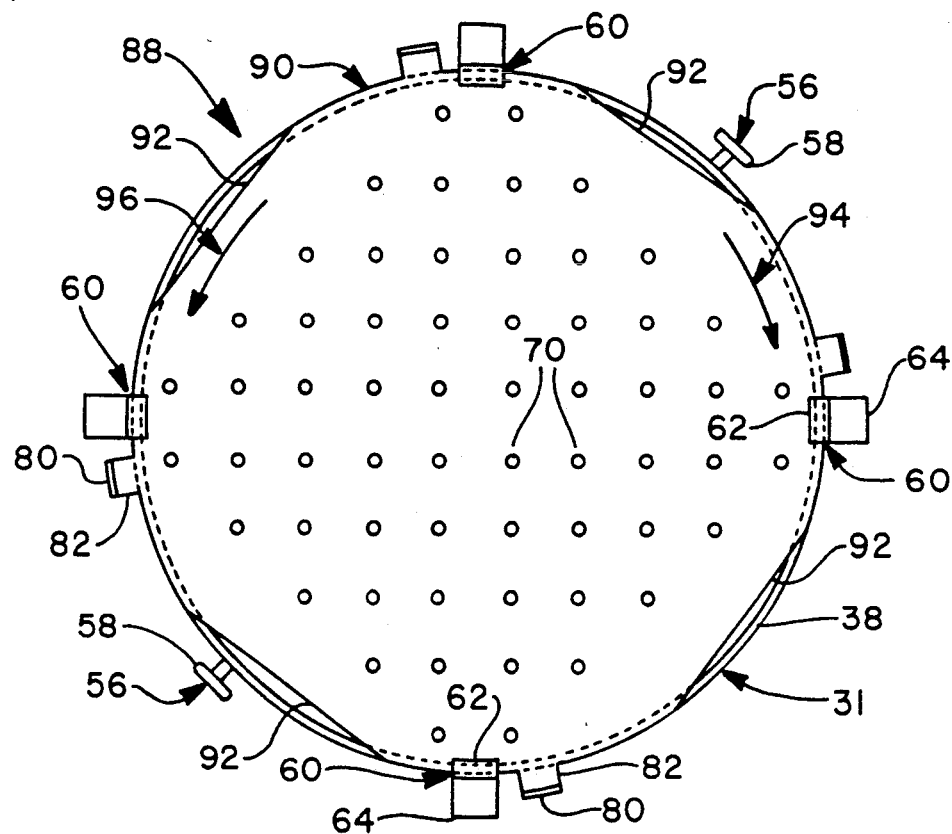
FIG. 7 is a bottom view of the accessory of FIG. 6 with the trivet in its locked position, i.e., the position in which it is detachably secured to the base of the accessory.

Referring again to the drawing, then, FIGS. 6 and 7 depict a cooking utensil accessory 88 which differs from the accessory 20 discussed above primarily in the design of the trivet 90 employed in accessory 88. In particular, trivet 90 differs from the above-discussed trivet 68 in location of the flats (in this case identified by reference character 92) which can be rotated to positions opposite the feet 62 of the accessory to allow the trivet to be manipulated past those feet in assembling it to and removing it from the accessory base 31. In trivet 90 these flats are located at equal intervals between the integral brackets 82 supporting the legs 80 of the trivet rather than adjacent those integral brackets as they are in trivet 68. Otherwise, the two trivets 68 and 88 may be duplicates.

Trivet 90 is assembled to the base 31 of cooking utensil accessory 88 in much the same manner that trivet 68 is assembled to the base of cooking utensil accessory 20. That is, to assemble the trivet to cooking utensil base 31, the flats 92 are located opposite the feet 62 at the lower ends of accessory legs 60. Trivet 90 is then manipulated past those legs until it lies between feet 62 and the lower edge 54 of accessory base 31. Thereafter, the trivet is rotated relative to base 31 in the direction indicated by arrow 94 until the integral brackets 82 supporting the legs 80 of the trivet engage the base-supporting legs 60 of accessory 88 (this is just beyond the relative trivet-base relationship shown in FIG. 7). In the assembled relationship just discussed, the base-supporting feet 62 again extend across the trivet as in above-discussed accessory 20. This allows trivet 90 to move up and down with respect to the lower edge of the base without separating from that component of cooking utensil accessory 88.

Subsequently reversing the direction of rotation of trivet 90 relative to base 31 as shown by arrow 96 in FIGS. 6 and 7 again brings the flats 92 of the trivet opposite the feet 62 at the lower ends of base-supporting legs 60. This allows the trivet to be manipulated past feet 62 and removed from the base 31 of accessory 88.

Figure 8:
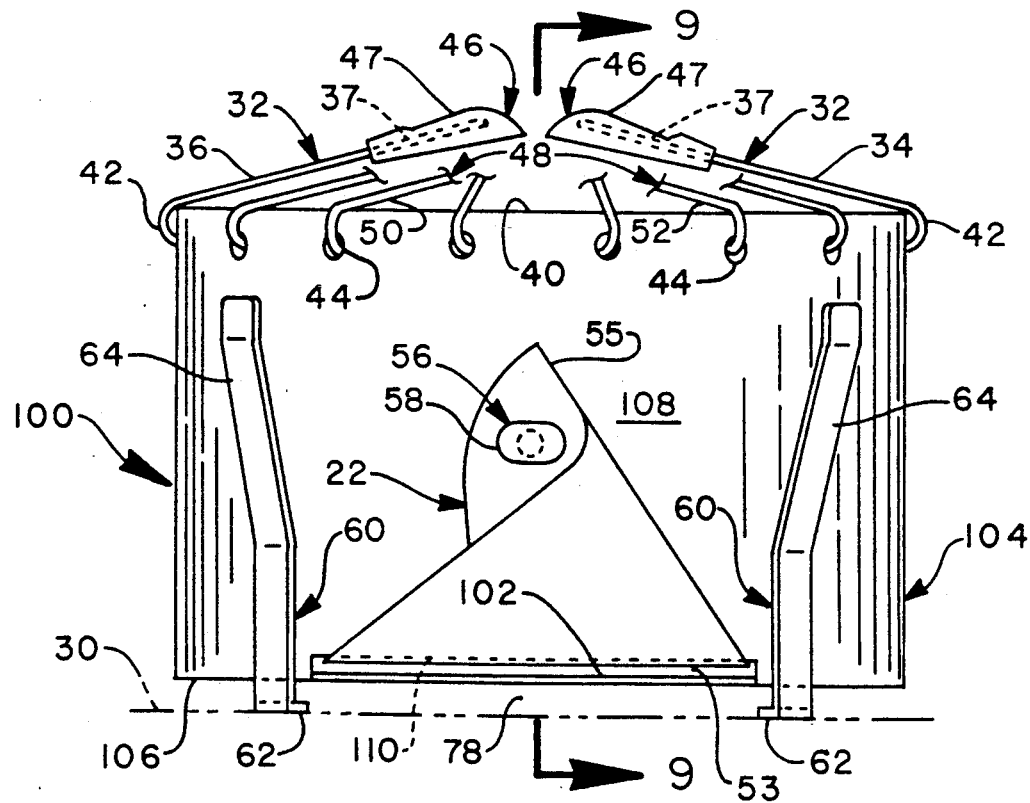
FIG. 8 is a side view of a third type of cooking utensil accessory which also embodies the principles of the present invention and has an integral, perforated trivet for supporting the lower end of a disposable cooking bag above the bottom of the cooking vessel in which the accessory is employed.
Figure 9:
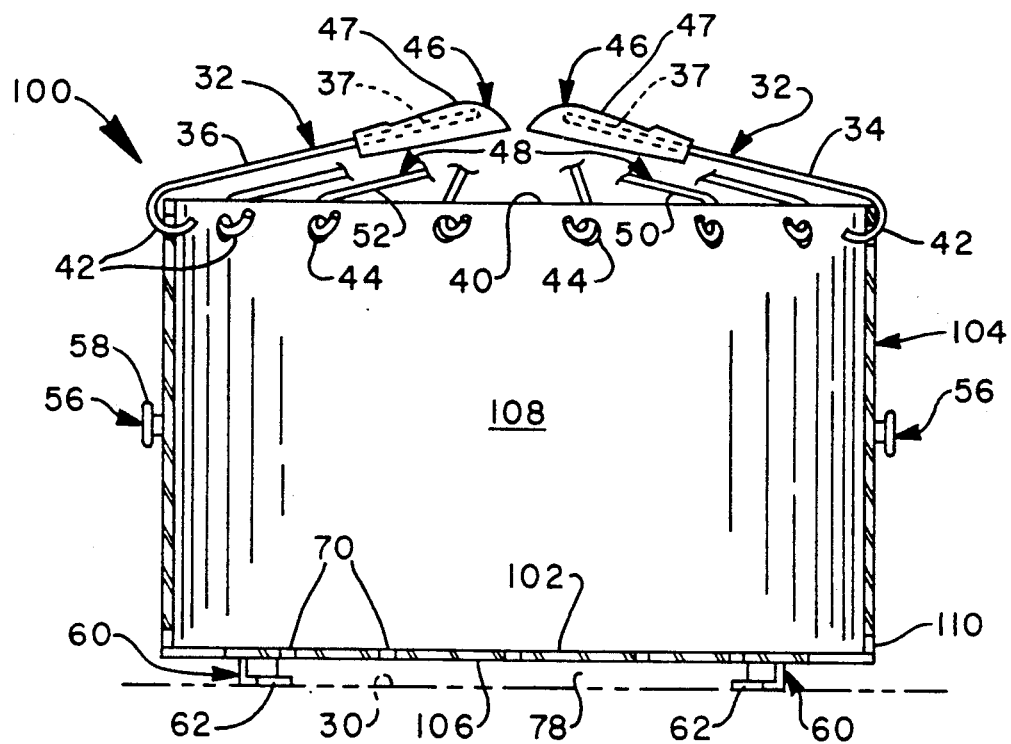
FIG. 9 is a section through the accessory of FIG. 8, taken substantially along line 9—9 of the latter figure.

Referring still to the drawing, the cooking utensil accessory 100 depicted in FIGS. 8 and 9 differs from the cooking utensil accessories 20 and 88 illustrated in FIGS. 1–7 and described above primarily in that, instead of a detachable trivet, it employs one (identified by reference character 102) which is integral with the base 104 of accessory 100. Typically, trivet 102 will be separately fabricated and then welded or otherwise joined to base 104 at the lower edge 106 thereof. Alternatively, the trivet and side wall 108 of accessory base 104 may be formed as a single component as by deep drawing a sheet of an appropriate stainless steel or other metal with high thermal conductivity or by forming the base/trivet component from an appropriate polymer.

In this embodiment of the invention, horizontally extending slots 110 are formed in the side wall 108 of accessory base 104. These are located immediately above trivet 102 and centered on the studs 56 to which the two lower corners 55 of disposable, comestibles-containing bag 22 are attached. As is apparent from FIG. 8, the two slots 110 associated with studs 56 allow the two bottom corners 55 of the bag 22 to be displaced through the side wall 108 of accessory base 104. Thus, those corners can subsequently be attached to studs 56.

Figure 10:
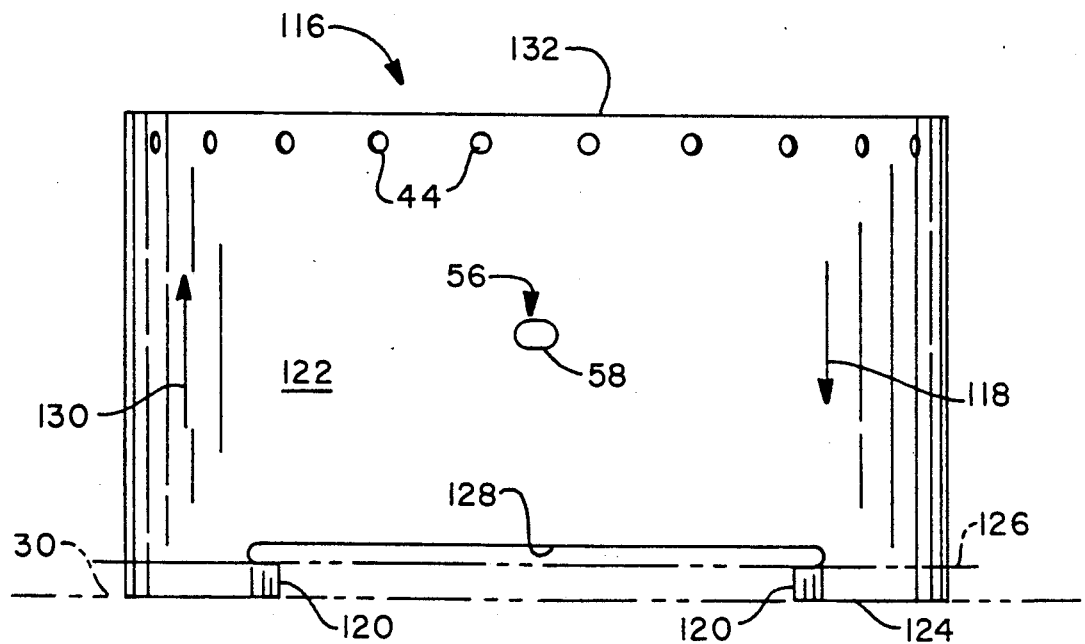
FIG. 10 is a side view of the base of a fourth embodiment of the invention; this embodiment also includes a removable trivet and, in addition, has the advantage of simplicity.
Figure 11:
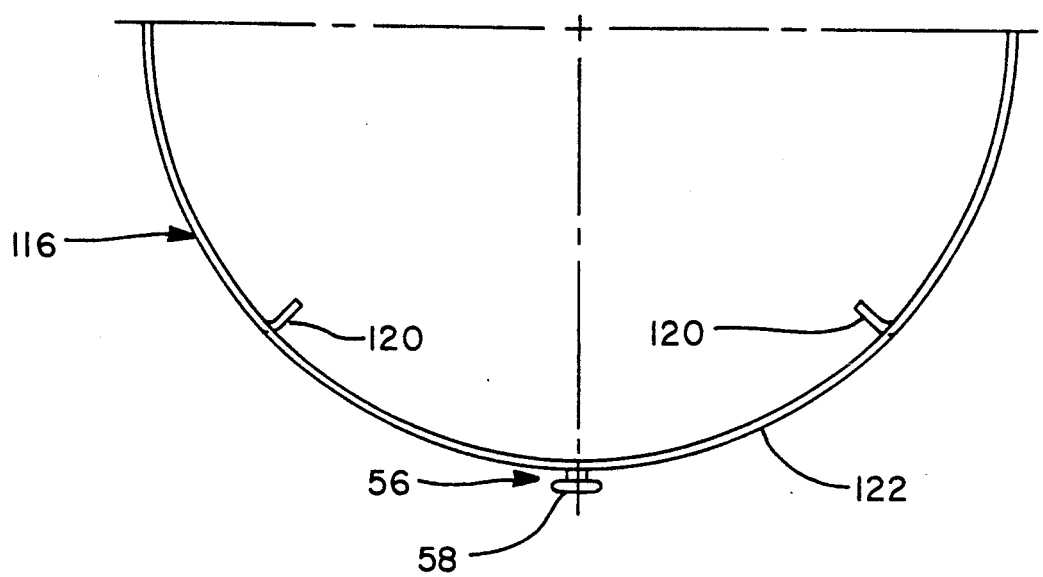
FIG. 11 is a half plan view of the accessory base depicted in FIG. 10.
Figure 12:
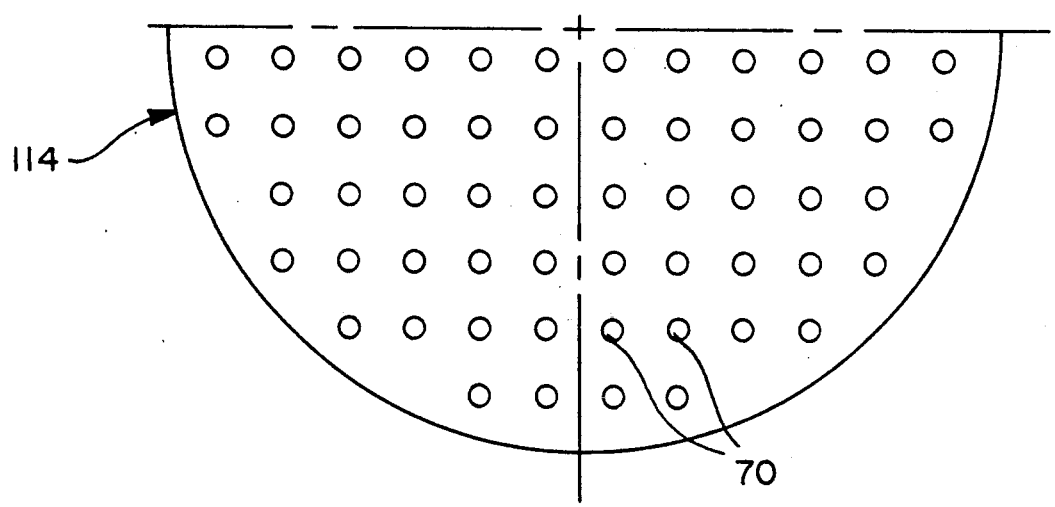
FIG. 12 is a plan view of the trivet employed with the base illustrated in FIGS. 10 and 11.

The cooking utensil shown in those FIGS. 10–12 is like those cooking utensil accessories discussed above and depicted in FIGS. 1–7 to the extent that it includes a circular trivet 114 which can be detachably assembled to and removed from a vertically orientable, cylindrical base 116. The accessory base 116 is, however, designed to be seated directly on the bottom 30 of the cooking utensil 24 in which the accessory is employed.

Trivet 114 has a diameter which is slightly less than the diameter of base 116. It is detachably assembled to the latter component by dropping it into base 116 from above as is suggested by arrow 118 in FIG. 10.

Thereupon, trivet 114 is supported in spaced relation to the bottom 30 of a cooking utensil 24 by two pairs of spaced apart, radial, inwardly directed tabs 120. These tabs are struck from the side wall 122 of base 116 at the lower edge 124 of the base and on opposite sides of side wall 122 as is best shown in FIG. 11.

The locus or level of thus assembled trivet 114 is identified by phantom line 126 in FIG. 10. Elongated, diametrically opposed, horizontal slots 128, one of which is shown in FIG. 10, are formed in the side wall 122 of base 116 above locus 126. These slots allow the lower corners 55 of a disposable cooking bag 22 to be displayed outwardly through base 116, trained upwardly, and hooked over the heads 58 of the two, diametrically opposed, side wall-supported studs 56.

Trivet 114 is easily and quickly removed from base 116 by reversing the process described above; i.e., i.e., by turning base 116 upside down and dropping the trivet out as suggested by arrow 130 in FIG. 10.

A cooking utensil accessory employing a base and trivet as depicted in FIGS. 10-12 will also include pivotable elements as discussed above for supporting the upper end of a disposable cooking bag from accessory base 116 and for enlarging and constricting the opening in the upper end of that bag. As in those embodiments of the invention described previously, the elements in question will be hooked into the apertures 44 spaced around, and at, the upper edge 132 of base 116.

As will be apparent to the reader from the foregoing, FIGS. 10-12 depict a cooking utensil accessory which differs from those embodiments of that invention illustrated in FIGS. 1-9 and discussed above primarily in that the separate, welded or otherwise attached, base-supporting legs of the previously described accessories are made unnecessary. As a consequence, the accessory is simpler and can be manufactured at a potentially low cost.

The invention may be embodied in forms other than those illustrated in the drawing and discussed above without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A cooking utensil accessory which comprises: a hollow, vertically orientable base with cylindrical side wall means; means for supporting a cooking bag in said base with an openable and closable end of said bag uppermost; trivet means for keeping the lower end of said bag out of contact with the bottom of a cooking vessel in which said accessory is deployed, said trivet means being located at, and spanning, the lower end of said base; and retainer means at intervals around said base for detachably affixing said trivet means to said base at the lower edge of said side wall means, said retainer means being spaced below and extending inwardly from the side wall means of said base and said trivet means being rotatable relative to said base between a first position in which it is trapped by said retainer means and a second position in which it can clear said retainer means and be detached from said base.

2. A cooking utensil accessory as defined in claim 1 in which said trivet means is so perforated as to allow the fluid cooking medium to circulate through the trivet and into contact with the disposable cooking bag supported in the base.

3. A cooking utensil accessory as defined in claim 1 in which said retainer means and said trivet means have means providing feet below said base and said trivet means for supporting said trivet means and said base above and in spaced relation to the bottom of the cooking vessel in which the accessory is deployed to promote the circulation of the cooking medium into heat transfer relationship with the lower end of the disposable cooking bag.

4. A cooking utensil accessory as defined in claim 3 wherein the retainer means are fixed to said base at said intervals therearound and have upper portions for spacing the base of the accessory from the side wall of the cooking vessel in which the accessory is installed to thereby promote the circulation of the cooking medium into heat transfer relationship with that part of said base facing the cooking vessel side wall.

5. A cooking utensil accessory as defined in claim 3 wherein the means providing said feet of said trivet means are fixed to said trivet means at intervals therearound.

6. A cooking utensil accessory as defined in claim 1 in which the trivet means is a flat, perforated, heat conductive plate.

7. A cooking utensil accessory as defined in claim 1 wherein said side wall means of said base extends vertically.

8. A cooking utensil accessory as defined in claim 1 wherein said trivet means has a configuration generally matching the cross-section of said base and has portions that are rotatable into alignment with said retainer means and that are relieved to the extent that said trivet means can be manipulated past said retainer means and detached from said base when said relieved portions of said trivet means are rotated into alignment with said retainer means.

9. A cooking utensil accessory as defined in claim 8 which includes stop means engageable with one of said retainer means to prevent rotation of the trivet means past the first position in which said trivet means is trapped by said retainer means.

10. A cooking utensil accessory as defined in claim 1 wherein said retainer means is so configured as to serve the additional function of spacing the lower edge of said base and a trivet means assembled to said base above the bottom of the utensil in which the accessory is employed.

11. A cooking utensil accessory as defined in claim 1 wherein said trivet means is displaceable in a vertical direction relative to said base and wherein there are feet at intervals around said trivet means for spacing said trivet means above the bottom of a utensil in which the accessory is employed to thereby promote the circulation of the cooking medium into heat transfer relationship with the lower side of said trivet means.

12. A cooking utensil accessory as defined in claim 1 which has means at the upper edge of said base for engaging and supporting the open upper end of a disposable cooking bag installed in said base from the base, said bag-supporting means being displaceable toward said base to close said upper end of said bag and away from said base to open said upper end of said bag.

13. A cooking utensil accessory as defined in claim 12 wherein the means for opening and closing the upper end of said bag comprises a plurality of inwardly extending elements fixed to said base for concomitant pivotal movement relative thereto, there being bag engageable means at the inner ends of said elements to which the bag can be attached at locations spaced equidistantly around and adjacent the upper end of the bag, whereby said elements can be concomitantly rotated toward each other to constrict the upper end of the bag during the cooking of the comestibles and away from each other to enlarge the opening in the upper end of the bag and furnish access to the comestibles in the bag.

14. A cooking utensil accessory as defined in claim 1 which comprises means fixed to said base to which the lower end of said disposable cooking bag can be attached to keep the bag and its contents from floating in a fluid cooking medium in the utensil with which the accessory is employed.

15. A cooking utensil accessory as defined in claim 1 wherein said base has apertures above the retainer means through which the lower corners of the disposable bag can be trained, and means on the exterior sides of the base to which said corners can be attached to anchor the lower end of said bag in place.

* * * * *